US008639056B2

(12) United States Patent
Zhai et al.

(10) Patent No.: US 8,639,056 B2
(45) Date of Patent: Jan. 28, 2014

(54) CONTRAST ENHANCEMENT

(75) Inventors: Jiefu Zhai, Cupertino, CA (US); Joan Llach, Cesson-Sevigne (FR)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/376,920

(22) PCT Filed: Jun. 28, 2010

(86) PCT No.: PCT/US2010/001848
§ 371 (c)(1),
(2), (4) Date: Dec. 8, 2011

(87) PCT Pub. No.: WO2011/008239
PCT Pub. Date: Jan. 20, 2011

(65) Prior Publication Data
US 2012/0082397 A1    Apr. 5, 2012

Related U.S. Application Data

(60) Provisional application No. 61/269,757, filed on Jun. 29, 2009.

(51) Int. Cl.
*G06K 9/40*    (2006.01)
(52) U.S. Cl.
USPC .......................... 382/274; 382/260; 382/265
(58) Field of Classification Search
USPC ......... 382/164, 167, 171, 173, 264–266, 274, 382/284; 348/362–364
See application file for complete search history.

(56) References Cited

U.S. PATENT DOCUMENTS

| | | | |
|---|---|---|---|
| 5,467,404 A | | 11/1995 | Vuylsteke et al. |
| 5,717,789 A | * | 2/1998 | Anderson et al. ............. 382/254 |
| 5,805,721 A | * | 9/1998 | Vuylsteke et al. ............ 382/128 |
| 6,359,617 B1 | | 3/2002 | Xiong |
| 6,593,970 B1 | * | 7/2003 | Serizawa et al. .............. 348/362 |
| 6,775,407 B1 | * | 8/2004 | Gindele et al. ................ 382/166 |
| 6,839,462 B1 | | 1/2005 | Kitney et al. |
| 7,010,174 B2 | | 3/2006 | Kang et al. |

(Continued)

FOREIGN PATENT DOCUMENTS

| | | |
|---|---|---|
| EP | 1758058 | 2/2007 |
| JP | 5244508 A | 9/1993 |
| JP | 2008294539 A | 12/2008 |

OTHER PUBLICATIONS

Dippel, S.; Stahl, M.; Wiemker, R.; Blaffert, T., "Multiscale contrast enhancement for radiographies: Laplacian pyramid versus fast wavelet transform," Medical Imaging, IEEE Transactions on, vol. 21, No. 4, pp. 343,353, Apr. 2002.*

(Continued)

*Primary Examiner* — Andrae S Allison
(74) *Attorney, Agent, or Firm* — Robert D. Shedd; Richard LaPeruta

(57) ABSTRACT

A method according to the invention enhances contrast of an image by accessing an original image, and establishing, assigning, or initializing pixel values and pixel coordinates of pixels of the image. Then, a Laplacian pyramid having an integral number of levels is generated for the image. A contrast boost pyramid is generated and applied to the Laplacian pyramid to obtain a modified Laplacian pyramid wherein values in the levels of the Laplacian pyramid are enhanced. An enhanced image is then constructed from the modified Laplacian pyramid.

8 Claims, 3 Drawing Sheets

(56) References Cited

U.S. PATENT DOCUMENTS

| | | | |
|---|---|---|---|
| 7,471,826 B1 | 12/2008 | Navon et al. | |
| 7,636,496 B2 * | 12/2009 | Duan et al. | 382/274 |
| 7,821,570 B2 * | 10/2010 | Gallagher et al. | 348/364 |
| 8,081,208 B2 | 12/2011 | Inomata et al. | |
| 8,135,230 B2 * | 3/2012 | Rempel et al. | 382/264 |
| 8,346,009 B2 * | 1/2013 | Zhai et al. | 382/274 |
| 2005/0117799 A1 | 6/2005 | Fuh et al. | |
| 2006/0262363 A1 | 11/2006 | Henley | |
| 2009/0034868 A1 * | 2/2009 | Rempel et al. | 382/264 |
| 2009/0169102 A1 * | 7/2009 | Zhang et al. | 382/167 |

OTHER PUBLICATIONS

Poelstra, M; Multi-Scale Video Enhancement Artifact reduction and contrast boosting, Faculty of Electrical Engineering Section Design Technology for Electronic Systems (ICStES), ICS-ES 862, Nov. 2005.*

Krawczyk et al, Lightness Perception in Tone Reproduction for High Dynamic Range Imagesfl , In: Proc. of Eurographics '05 (Computer Graphics Forum, vol. 24), 2005.

Dippel et al., Multiscale Contrast Enhancement for Radiographies: Laplacian Pyramid Versus Fast Wavelet Transform, IEEE Transactions on Medical Imaging, vol. 21, No. 4, Apr. 2002.

Vuylsteke et al., Multiscale Image Constrast Amplification (MUSICATM), SPIV, vol. 2167, Image Processing, 1994.

Toet, "Adaptive Multi-Scale Contrast Enhancement Through Non-Linear Pyramid Recombination", Pattern Recognition Letters, No. 11, Amsterdam,NL, pp. 735-742.

Yee et al., "Segmentation and Adaptive Assimilation for Detail-Preserving Display of High-Dynamic Range Images," The Visual Computer, published online Jul. 8, 2003, copyright Springer-Verlag 2003, pp. 457-466.

Seetzen et al., "High Dynamic Range Display Systems," ACM SIGGRAPH Conference Proceedings, ACM Press, Aug. 9, 2004, pp. 1-9.

Reinhard et al., "Photographic Tone Reproduction for Digital Images," ACM Transactions on Graphics, 21, 3: 267-276, Jul. 2002.

Reinhard et al., "Dynamic Range Reduction Inspired by Photoreceptor Physiology," IEEE Transactions on Visualization and Computer Graphics, vol. 11, No. 1, Jan./Feb. 2005, pp. 13-24.

Mertens et al., "Exposure Fusion," Pacific Graphics 2007, 9 pages.

Lischinski et al., "Interactive Local Adjustment of Tonal Values," Copyright 2006 by the Association for Computing Machinery, Inc., pp. 646-653.

Krawczyk et al., "Computational Model of Lightness Perception in High Dynamic Range Imaging," Proc. of SPIE-IS&T Imaging, SPIE vol. 6057, 605708, 12 pages, 2006.

Fattal et al., "Gradient Domain High Dynamic Range Compression," ACM Transactions on Graphics, 21(3): pp. 249-256, 2002.

Fairchild et al., "The iCAM Framework for Image Appearance, Image Differences, and Image Quality," Journal of Electronic Imaging, 13: 126-138, 2004, 34 pages.

Durand et al., "Fast Bilateral Filtering for the Display of High-Dynamic-Range Images," ACM Transactions on Graphics, 21(3): 257-266, 2002.

Drago et al., "Adaptive Logarithmic Mapping for Displaying High Contrast Scenes," Computer Graphics Forum, vol. 22(3), 9 pages, The Eurographics Assoc. and Blackwell Publishers 2003.

Chiu et al., "Spatially Nonuniform Scaling Functions for High Contrast Images," Proceedings from Graphics Interface '93, pp. 245-253, Toronto, May 1993.

Burt et al., "The Laplacian Pyramid as a Compact Image Code," IEEE Transactions on Communications, vol. COM-31, No. 4, Apr. 1983, pp. 532-540.

Burt et al., "Enhanced Image Capture Through Fusion," IEEE 1993, David Sarnoff Research Center, Princeton, NJ, pp. 173-182.

Agarwala et al., "Interactive Digital Photomontage," The ACM SIGGRAPH 2004 Conference Proceedings, 9 pages.

Wikipedia, "Pyramid (image processing)," http://en.wikipedia.org/wiki/Pyramid_(image_processing), 2 pages.

\* cited by examiner

CONTRAST ENHANCEMENT

CROSS-REFERENCE INFORMATION

This application claims the benefit, under 35 U.S.C. §365 of International Application PCT/US2010/001848, filed Jun. 28, 2010 which was published in accordance with PCT Article 21(2) on Jan. 20, 2011 in English and which claims the benefit of U.S. provisional patent application No. 61/269,757 filed Jun. 29, 2009.

FIELD OF THE INVENTION

The invention is related to a method of enhancing the contrast of a picture using a multi-resolution approach and more particularly to the use of a non-linear scaling of the coefficients of the Laplacian pyramid to improve the contrast of an image.

BACKGROUND OF THE INVENTION

Contrast enhancement is a common method used to modify the appearance of an image, either on a display or on other physical support. There are many contrast enhancement methods available. Basic approaches use a single response curve to process the entire image, like linear stretching or histogram equalization. Even if the proper creation of the response curve might allow changing both local and global contrast, these approaches do not take into account the spatial distribution of pixel values on the image and therefore do not provide the optimal result.

More advanced contrast enhancement techniques use adaptive algorithms that modify the response curve based on local image characteristics. While this allows using different contrast enhancement parameters on different regions of the image, these methods still depend on what neighborhood size is used to estimate local image characteristics. Small neighborhoods provide better contrast enhancement for small objects, whereas larger neighborhoods provide better global contrast. Even if the neighborhood size could be changed between pixels, these methods do not allow processing each pixel at different scales and therefore do not provide the optimal result. While methods are available to modify the contrast of an image, operating both at image level (global contrast) and region level (local contrast), the existing methods cannot handle multiple scales simultaneously.

SUMMARY OF THE INVENTION

A multi-resolution decomposition of the image according to the invention addresses this limitation. A method according to the invention enhances contrast of an image by accessing an original image, and establishing, assigning, or initializing pixel values and pixel coordinates of pixels of the image. Then, a Laplacian pyramid having an integral number of levels is generated for the image. A contrast boost pyramid is generated and applied to the Laplacian pyramid to obtain a modified Laplacian pyramid wherein values in the levels of the Laplacian pyramid are enhanced. An enhanced image is then constructed from the modified Laplacian pyramid. The method can include feature wherein values of at least one level are enhanced more than those of another level.

A method for enhancing contrast of an image can also comprise accessing at least one original image; generating a multi-scale signal representation of the at least one original image having an integral number of levels; and processing the at least one original image responsive to the multi-scale representation to generate at least one enhanced image. The method can further include one or more of the steps of generating a pyramid representation of the at least one original image to form the multi-scale signal representation of the at least one original image; employing a bandpass pyramid methodology to generate the pyramid representation, in which the pyramid representation can be a Laplacian pyramid $I^k$, where $k=\{1, \ldots, K\}$ and K is the number of levels in the Laplacian pyramid; generating a contrast boost pyramid $B^k$, the contrast boost pyramid being a function that changes the Laplacian pyramid non-linearly when applied thereto; and employing a power function to generate the contrast boost pyramid, the power function having a shape controller means and/or a boost intensity means. The method can include in addition to the step of generating Laplacian pyramids and corresponding contrast boost pyramids associated with each of the original images, a step of fusing the boosted Laplacian pyramids to create a composite image which can include a Gaussian pyramid weight corresponding to each of the original images. The method can further include the step of applying a user command responsive to the multi-scale representation through a user interface to generate at least one enhanced image, wherein this step can involve the user selecting or controlling the shape controller means and/or a boost intensity means through the user interface to increase contrast in at least one portion of an image.

BRIEF DESCRIPTION OF THE DRAWINGS

The invention will now be described by way of example with reference to the accompanying figures of which.

DETAILED DESCRIPTION OF THE EMBODIMENTS

Figure 1:
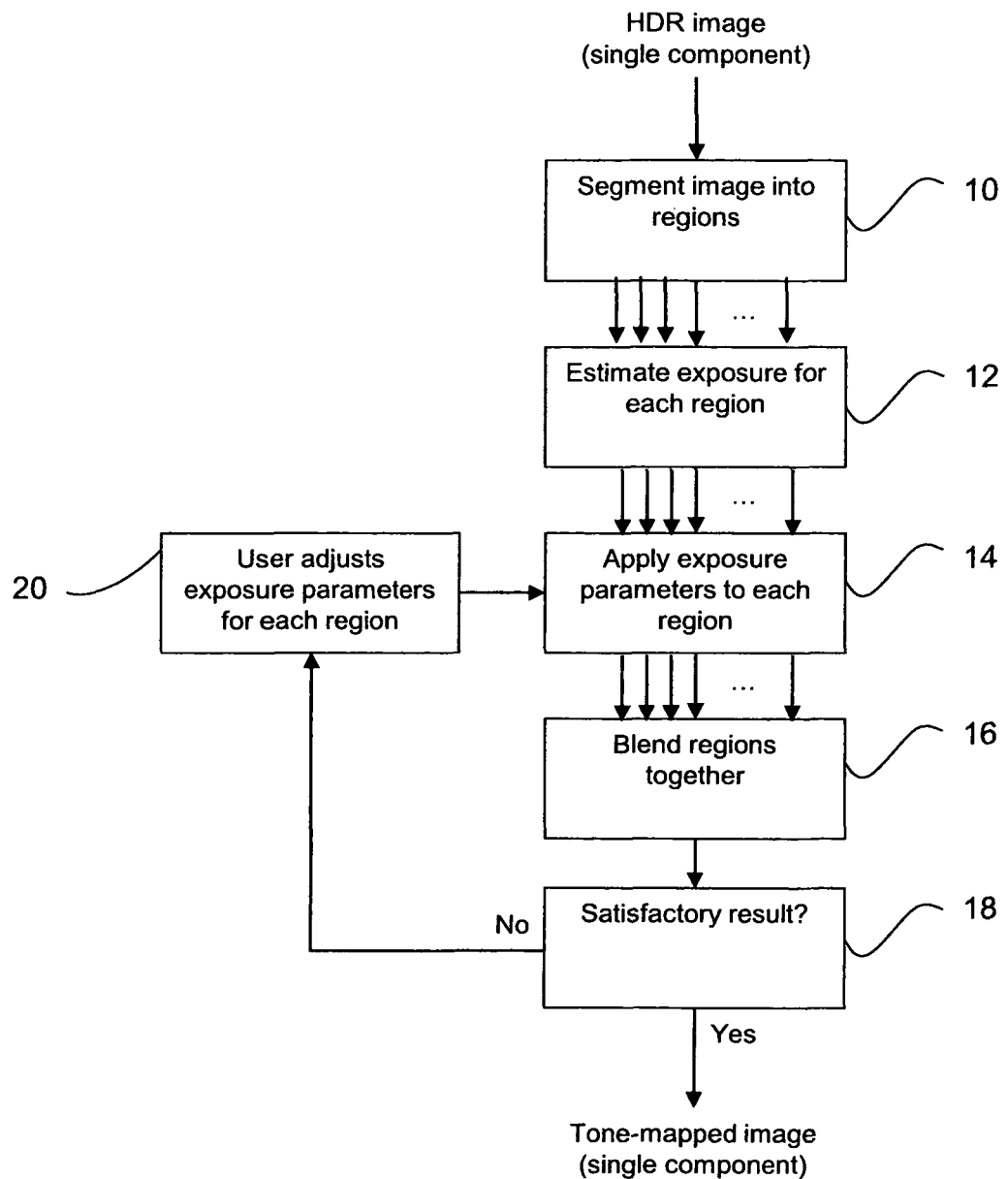
FIG. 1 is a flow diagram of a zone based tone mapping method according to the invention.

The invention will now be described in more detail beginning first with an overview description of zone based tone mapping framework within which a contrast enhancement algorithm of the invention operates. The zone based tone mapping framework is illustrated in FIG. 1 and comprises the following main steps.

The input high dynamic range (HDR) image is first divided into different regions at step 10. It can be a hard segmentation or a fuzzy one. In either case, each region can be represented by a matrix, where each element of the matrix is the probability (weight) of a pixel. If a hard segmentation is used, image pixels belong to a single region and therefore the probability is either 0 or 1. If a fuzzy segmentation is used, each pixel can spread over several (even all) regions, and therefore the probability can take any value between 0 and 1.

Then, at step 12, the algorithm decides to which zone each region will be mapped. This essentially estimates the exposure for each region. The mapping between region and zone can also be done with user interaction.

Next, at step 14, each region is exposed with its own exposure parameters.

Afterwards, at step 16, a fusion or blending process is employed to generate the final tone mapped image by fusing the different regions together (each exposed with its own exposure value) using the weights obtained in step 10.

Optionally, at steps 18 and 20, the user can check the look of the tone mapped image and make changes to the exposure value of one or more regions and then repeat steps 14-18 until the result is satisfactory.

For video tone mapping, the process can be carried out for one key frame in a scene and then applied with the same parameters to all frames in the scene.

Now a contrast enhancement algorithm applied at step 16 will be described in further detail with reference to FIG. 2 and begins generally with a description of pyramids used in the algorithm. A pyramid (or pyramid representation) is a multi-scale signal representation in which a signal (or an image) is subject to repeated smoothing and subsampling. Two types of pyramids will be described: a lowpass pyramid and a bandpass pyramid.

A lowpass pyramid is generated by first smoothing the image with an appropriate smoothing filter and then subsampling the smoothed image, usually by a factor of two along each coordinate direction. As this process proceeds, the result will be a set of gradually more smoothed images, wherein the spatial sampling density decreases level by level. If illustrated graphically, this multi-scale representation will look like a pyramid, from which the name has been obtained. Gaussian pyramids are lowpass pyramids.

A bandpass pyramid, known as a Laplacian pyramid is obtained by forming the difference between adjacent levels in a pyramid, wherein an interpolation is performed between representations at adjacent levels of resolution, to enable the computation of pixelwise differences.

The approach can begin by denoting I as color component of a digital image. Then, I(i,j) represents the value of the pixel at coordinates (i,j). Next, one candenote by $I^k$ for one level of the Laplacian pyramid of image I, where $k=\{1,\ldots,K\}$. k is the level and K the number of levels in the pyramid.

Figure 2:
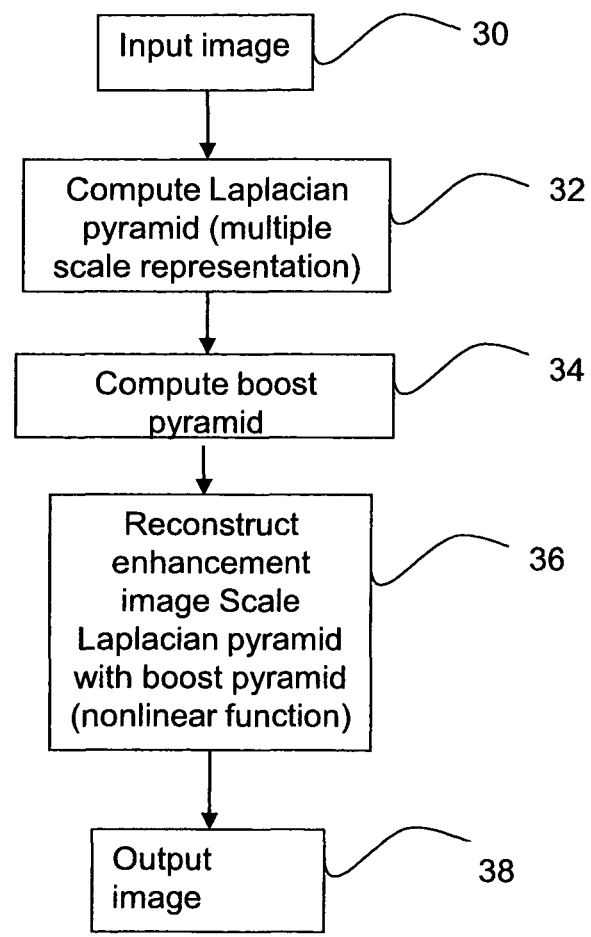
FIG. 2 is a flow diagram of a contrast enhancement method according to the invention.

Given the input image I, a contrast enhancement algorithm according to the invention has the following main steps as shown in FIG. 2:

1. Create Laplacian pyramid $I^k$, $k=\{1,\ldots,K\}$ at step 32 from the input image received at step 30;
2. Compute contrast boost pyramid $B^k$ at step 34;
3. Reconstruct image from the following pyramid $I^k \cdot B^k$, $k=\{1,\ldots,K\}$ at step 36.

Other image enhancement methods that are based on a difference of the Gaussian pyramid can only enhance the image at one certain scale at a time. By contrast the proposed method can enhance the contrast at different scales at the same time.

By properly scaling the coefficients of the Laplacian pyramid with a contrast boost pyramid, the method of the invention can increase contrast at multiple scales. At the same time, the reconstruction process of the image (where all the levels of the pyramid are blended together) ensures that the contrast enhanced image is free from artifacts. The method advantageously uses a Laplacian pyramid to enhance image at multiple scales at once.

Referring again to FIG. 2, a more detailed description of the inventive method is provided. First an image is input at step 30. A nonlinear function of the image Laplacian pyramid is used to compute the contrast boost pyramid at step 32. The basic idea is to increase the magnitude of small coefficients and keep large coefficients the same or slightly decreased. At the same time, all coefficients should maintain their own sign. For the top level in the pyramid, the boost pyramid should be a constant matrix with all entries equal to one. This will apply no changes to the top level of the image Laplacian pyramid and consequently does not change the low frequencies of the image. Essentially any nonlinear function that serves this purpose can be used to compute the boost pyramid at step 34. In a particular embodiment, a power function is used to compute the boost pyramid as in the following equation:

$$\begin{cases} B^k(i,j) = 1 & k = K \\ B^k(i,j) = \left(\frac{|I^k(i,j)|}{\alpha}\right)^{\beta-1} & k = \{1,\ldots,K-1\} \end{cases} \quad (1)$$

Here, shape controller, $\alpha$ is in the range [0,1], which for this approach can optimally be between 0.2 and 0.4, and boost intensity, $\beta$ is a positive number which can optimally be selected in the range [0,2]. Note that $\beta>1$ increases the contrast, whereas $\beta>1$ reduces the contrast. With these two parameters, one can control how much enhancement to apply to the image.

The Laplacian pyramid of the enhanced image $I^k$ can be computed by $$\tilde{I}^k(i,j) = I^k(i,j) * B^k(i,j)$$

Since all entries of boost pyramid are positive numbers, each coefficient of the Laplacian pyramid of enhanced image has the same sign as those of original one. The magnitudes of the coefficients are scaled in a spatial varying way, ie. coefficients with a small absolute value are scaled more. This has the clear advantage over the linear scaling of coefficients in that the image enhancement artifacts are much less visible.

Figure 3:
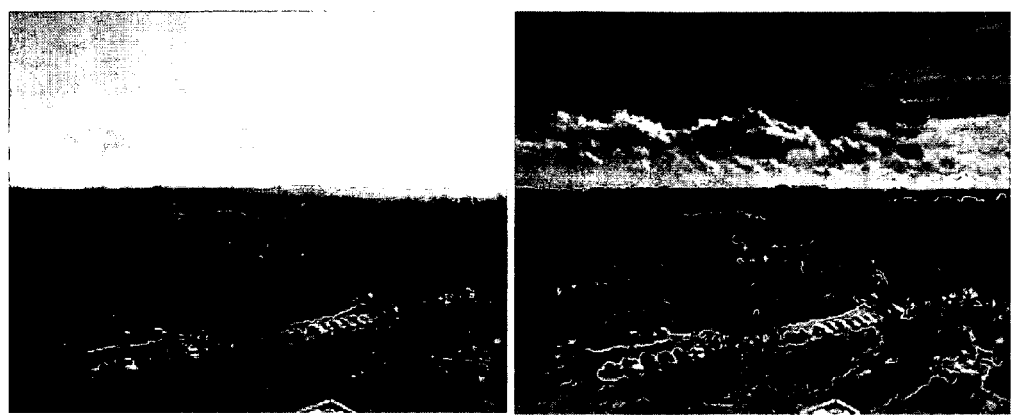
FIG. 3 is shows a pair of sample images wherein one has been enhanced according to the methods of the invention.

The image enhancement method described here can be used in image fusion applications. The method is especially suitable for image fusion with a Laplacian pyramid because it adds very little computational complexity. Results of such an application are shown in FIG. 3 wherein the left side image is an original image and the right side image is a contrast enhanced image. Here, improved contrast can be seen both in the sky and land portions of the image.

Image fusion is a technique used in many image processing applications. In multi-sensor photography, it serves to combine multi-spectral data (e.g. infra red and visible) onto a single image. In macro photography, it allows increasing the depth of field. And image fusion can also be used in tone mapping algorithms to combine multiple low dynamic range (LDR) exposures together in a tone mapped image.

Given a set of images In and their corresponding image weights $W_n$, $n=\{1,\ldots N\}$, the N images can be fused together by linearly combining the Laplacian pyramid of the images, Ink, and the Gaussian pyramid of the weights, $W_n^k$, as follows:

$$T^k(i,j) = \sum_n I_n^k(i,j) \cdot W_n^k(i,j)$$

Then reconstructing the image at step 36 from $T^k$, $k=\{1,\ldots,K\}$ and outputting it at step 38.

In many scenarios, images to be fused are better enhanced before the fusion process. Traditionally image enhancement is done on spatial domain and then all images to be fused are transformed into Laplacian domain and fused according to the above equation. Using the methods described here, the multi-scale image enhancement is applied directly in the fusion process with only minor changes to the fusion equation. This greatly reduces computational complexity. In such an implementation, the equation is modified as follows:

$$T^k(i,j) = \sum_n l_n^k(i,j) \cdot W_n^k(i,j) \cdot B_n^k(i,j)$$

where $B_n^k$, $k=\{1, \ldots, K\}$, is the contrast boost pyramid of image In. With this changed fusion equation, the image enhancement step is done directly in the Laplacian domain and there is no need to do the image enhancement in the spatial domain.

As before, the image is reconstructed from $T^k$, $k=\{1, \ldots, K\}$.

Some variations on the method are possible and considered to be within the scope of the invention. For example, different $\alpha$ and $\beta$ parameters may be used at each level of the pyramid. Adaptive weights may be used for the higher level of the contrast boost pyramid, $B^K$. The contrast boost pyramid $B^k$, $k=\{1, \ldots, K\}$, (equation 1) may be computed using a different formulation.

More implementations having particular features and aspects are possible. However, features and aspects of described implementations may also be adapted for other implementations.

For example, these implementations and features may be used in the context of coding video and/or coding other types of data. Additionally, these implementations and features may be used in the context of, or adapted for use in the context of, the H.264/MPEG-4 AVC (AVC) Standard, the AVC standard with the MVC extension, the AVC standard with the SVC extension, a 3DV standard, and/or with another standard (existing or future), or in a context that does not involve a standard.

Additionally, implementations may signal information using a variety of techniques including, but not limited to, SEI messages, slice headers, other high level syntax, non-high-level syntax, out-of-band information, datastream data, and implicit signaling. Accordingly, although implementations described herein may be described in a particular context, such descriptions should in no way be taken as limiting the features and concepts to such implementations or contexts.

At least one implementation can be used to process the entire image at once, or by regions. The latter is especially useful in image fusion based processing algorithms, like for instance various tone mapping methods.

At least one implementation includes a method to enhance the contrast of a picture using a multi-resolution approach. As described above, in at least one implementation the use of a non-linear scaling of the coefficients of the Laplacian pyramid improves the contrast of the image.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

The implementations described herein may be implemented in, for example, a method or a process, an apparatus, a software program, a data stream, or a signal signal for each and any step can involve user interfacing using an appropriate user interface to make adjustments and/or enhancements such as by changing shape controller or boost intensity. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors or interfaces also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices and user interfaces. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A method for enhancing contrast of an image comprising:
accessing at least one original image;
generating a multi-scale signal representation of the at least one original image having an integral number of levels;
processing the at least one original image responsive to the multi-scale representation to generate at least one enhanced image; and
generating a pyramid representation of the at least one original image to form the multi-scale signal representation of the at least one original image;
wherein a bandpass pyramid methodology is employed to generate the pyramid representation, the pyramid representation is a Laplacian pyramid $I^k$, where $k=\{1, \ldots, K\}$ and K is the number of levels in the Laplacian pyramid;
wherein a contrast boost pyramid $B^k$ is generated, the contrast boost pyramid being a function that changes the Laplacian pyramid non-linearly when applied thereto;
wherein a power function is generated to generate the contrast boost pyramid, the power function being expressed as $$\begin{cases} B^k(i,j) = 1 & k = K \\ B^k(i,j) = \left(\frac{|I^k(i,j)|}{\alpha}\right)^{\beta-1} & k = \{1, \ldots, K-1\} \end{cases}$$

wherein shape controller $\alpha$ is in the range [0,1] and boost intensity $\beta$ is a positive number in the range [0,2].

2. The method of claim 1, further comprising the step of selecting and applying a value of $\beta$ that is less than 1 to enhance contrast.

3. The method of claim 1, further comprising the step of selecting and applying a value of $\beta$ that is greater than 1 to reduce contrast.

4. A method for enhancing contrast of an image comprising:
accessing at least one original image;
generating a multi-scale signal representation of the at least one original image having an integral number of levels;
processing the at least one original image responsive to the multi-scale representation to generate at least one enhanced image;
generating a pyramid representation of the at least one original image to form the multi-scale signal representation of the at least one original image; wherein a bandpass pyramid methodology is employed to generate the pyramid representation; wherein the pyramid representation is a Laplacian pyramid $I^k$, where $k=\{1, \ldots, K\}$ and K is the number of levels in the Laplacian pyramid;
wherein a contrast boost pyramid $B^k$ is generate, the contrast boost pyramid being a function that changes the Laplacian pyramid non-linearly when applied thereto; and
applying the contrast boost pyramid $B^k$ to Laplacian pyramid as follows:

$$J^k(i,j) = I^k(i,j) * B^k(i,j)$$

wherein $J^k$ is a kth level of a pyramid of an enhanced image.

5. The method of claim 4, further comprising the steps of:
accessing more than one original image;
generating Laplacian pyramids and corresponding contrast boost pyramids associated with each of the original images, thereby creating a boosted Laplacian pyramid for each image;
fusing the boosted Laplacian pyramids to create a composite image which according to $$T^k(i,j) = \sum_n I_n^k(i,j) \cdot W_n^k(i,j)$$

wherein $W_n^k$ is a Gaussian pyramid weight corresponding to each of the original images.

6. The method of claim 4, further comprising the steps of:
accessing more than one original image;
generating Laplacian pyramids and corresponding contrast boost pyramids associated with each of the original images, thereby creating a boosted Laplacian pyramid for each image;
fusing the boosted Laplacian pyramids to create a composite image according to $$T^k(i,j) = \sum_n I_n^k(i,j) \cdot W_n^k(i,j) \cdot B_n^k(i,j)$$

wherein $W_n^k$ is a Gaussian pyramid weight corresponding to each of the original images and $B_n^k$, is the contrast boost pyramid of image $I_n$.

7. A method comprising:
accessing at least one original image;
generating a multi-scale signal representation of the at least one original image having an integral number of levels;
processing the at least one original image responsive to the multi-scale representation;
applying a user command responsive to the multi-scale representation through a user interface to generate at least one enhanced image;
generating a pyramid representation of the at least one original image to form the multi-scale signal representation of the at least one original image;
employing a bandpass pyramid methodology to generate the pyramid representation, wherein the pyramid representation is a Laplacian pyramid $I^k$, where $k=\{1, \ldots, K\}$ and K is the number of levels in the Laplacian pyramid;
generating a contrast boost pyramid $B^k$, the contrast boost pyramid being a function that changes the Laplacian pyramid non-linearly when applied thereto; and
employing a power function to generate the contrast boost pyramid, the power function being expressed as $$\begin{cases} B^k(i,j) = 1 & k = K \\ B^k(i,j) = \left(\frac{|I^k(i,j)|}{\alpha}\right)^{\beta-1} & k = \{1, \ldots, K-1\} \end{cases}$$

wherein shape controller $\alpha$ is in the range [0,1] and boost intensity $\beta$ is a positive number in the range [0,2].

8. The method of claim 7, wherein in the applying a user command step the user selects at one value of $\beta$ and/or one value of $\alpha$ through the user interface to increase contrast in at least one portion of an image.

\* \* \* \* \*